US007423717B2

(12) United States Patent
Kadotani

(10) Patent No.: US 7,423,717 B2
(45) Date of Patent: Sep. 9, 2008

(54) LIQUID CRYSTAL DISPLAY DEVICE COMPRISING POST-LIKE SPACERS IN CONTACT WITH A STEP FILM HAVING A THICKNESS BETWEEN 2,000 ANGSTROM TO 5,000 ANGSTROM

(75) Inventor: Tsutomu Kadotani, Kanagawa (JP)

(73) Assignee: NEC LCD Technologies, Ltd., Kawasaki, Kanagawa (JP)

( * ) Notice: Subject to any disclaimer, the term of this patent is extended or adjusted under 35 U.S.C. 154(b) by 95 days.

(21) Appl. No.: 11/113,125

(22) Filed: Apr. 25, 2005

(65) Prior Publication Data

US 2005/0237470 A1 Oct. 27, 2005

(30) Foreign Application Priority Data

Apr. 26, 2004 (JP) ............................ 2004-130007
Mar. 2, 2005 (JP) ............................ 2005-056841

(51) Int. Cl.
*G02F 1/1339* (2006.01)

(52) U.S. Cl. .................................................... 349/155

(58) Field of Classification Search ................. 349/155, 349/156, 138, 106, 110, 43
See application file for complete search history.

(56) References Cited

U.S. PATENT DOCUMENTS 6,972,822 B2 * 12/2005 Miyashita .................. 349/156
7,304,712 B2 * 12/2007 Sawasaki et al. ............ 349/156
2004/0114087 A1 * 6/2004 Cho et al. .................. 349/155

FOREIGN PATENT DOCUMENTS

JP 2002-182220 6/2002
JP 2002-341354 11/2002

* cited by examiner

*Primary Examiner*—Thoi V Duong
(74) *Attorney, Agent, or Firm*—McGinn IP Law Group, PLLC

(57) ABSTRACT

A liquid crystal display device, which uses post-like spacers for eliminating local gap irregularity generation and permitting improvement of black view non-uniform irregularities and lower part gap irregularities, is disclosed. On an array side substrate 201 opposing first group post-like spacers, for each pixel, a step film 100 is formed by adequately combining by one or more floating inorganic film layers (for instance chromium layers 41 and 43, an aluminum layer 42 and am amorphous silicon layer 31). The first gap post-like spacers 304 are each in contact with the step film 100 at all times. The inorganic step film 100 is not formed on each of parts of the array side substrate 201 corresponding to second group port-like spacers 304, respectively, thus providing a gap. The thickness of the step film 100 is preferably set to 2,000 Å to 5,000 Å.

13 Claims, 16 Drawing Sheets

< <

LIQUID CRYSTAL DISPLAY DEVICE COMPRISING POST-LIKE SPACERS IN CONTACT WITH A STEP FILM HAVING A THICKNESS BETWEEN 2,000 ANGSTROM TO 5,000 ANGSTROM

BACKGROUND OF THE INVENTION

This application claims benefit of Japanese Patent Application Nos. 2004-130007 and 2005-056841 filed on Apr. 26, 2004 and Mar. 2, 2005, respectively, the contents of which are incorporated by the reference.

The present invention relates to liquid crystal display device and, more particularly, to an in-plane switching mode (electric field) type liquid crystal display device, comprising an array substrate, a common electrode substrate and liquid crystal sealed between the two substrates, the common electrode substrate having a plurality of post-like spacers formed on the surface opposing the array substrate and at positions dispersed in the opposing surface plane such as to keep a predetermined gap between the two substrates.

As for main terms used in this specification, their summary will be given briefly before they are described in detail with specific examples.

"Array substrate" is meant a (glass) substrate (array side substrate) formed, on the principal surface thereof, with an array of switching elements as active elements such as TFTs each disposed in the vicinity of each of the intersections between a plurality of scan lines (i.e., gate lines (or low lines) Y1, Y2, . . . , Yn), on each of which an address signal is supplied from a scan circuit, and a plurality of signal lines (i.e., data lines (column lines) X1, X2, . . . , Xm, on each of which a data signal is supplied from a hold circuit, a plurality of pixel electrodes each correspondingly connected to each of the witching elements, and common electrodes each disposed in correspondence to each of the pixel electrodes such as to generate an in-plane electric field. This substrate is also referred to as active matrix substrate or active matrix LCD glass substrate.

"Common electrode substrate" is meant a glass substrate, which is substantially parallel to, opposing and spaced apart a predetermined distance from the array substrate, has color filers (CF layers) formed on the opposing surface and seals liquid crystal between the array substrate and itself. This substrate is also referred to as opposing substrate (or opposing side substrate) or a CF substrate or a color filter substrate.

"Spacer" is meant a gap material used for providing a constant gap (i.e., LCD gap, cell gap or a gap) between the array substrate and the common electrode substrate. Sometimes, granular (or spherical) material such as "Micropearl" (Trademark) is sprinkled with a spacer sprinkler. In the technique according to the present invention, post-like spacers are provided each at a fixed position on the common electrode substrate such as to form a predetermined pattern as the distribution status.

"Black display non-uniformity irregularities" is meant a phenomenon of irregularity generation in the display due to generation of optical anisotropy in the substrate (i.e., glass) caused by deviational friction (i.e., stress having a component in the direction of deviational force exerted to the surface areas in contact with the spacers, (the deviational force being generated as a result of externally caused relative position deviation of the array substrate and the common electrode substrate from each other in the plane of the substrate). Since this phenomenon stems from residual stress in the substrate, natural recovery can not be obtained. In the in-plane electric field type liquid crystal display device, this phenomenon is particularly pronounced in the case of a display which should be a black view.

"Local gap irregularities" is meant a phenomenon that the distance (i.e., gap) between the array substrate and the common electrode substrate is not uniform in the entire substrate surface but locally varied. This phenomenon occurs in such case as when the spacers are plastically deformed by a stress exerted in excess of the limit of elasticity.

"High temperature gap irregularities (or lower part gap irregularities)" is meant a phenomenon based on the increase of the gap between the array substrate and the common electrode substrate as a result of inflation of the liquid crystal caused when the liquid crystal display device is used at a high temperature. More specifically, when the gap is increased beyond the limit of recovery from deformation of the post spacers (i.e., when the liquid crystal accommodation part is inflated), the liquid crystal is by gravitational force to gather in the neighborhood of inflated lower part of the liquid crystal display device, thus generating gap irregularities.

Liquid crystal display device find extensive applications as thin, light-weight and low power consumption flat panel displays. Among these display device is an in-lane switching mode type liquid crystal display. In this display, an in-plane electric field is generated between pixel electrodes formed on an active matrix substrate (or array side electrode) and opposing electrodes, whereby liquid crystal sealed between the active matrix substrate and the opposing substrate is caused to undergo rotation substantially horizontally in the substrate plane so as to provide the display. From this operation mode, the liquid crystal display can provide a broad sight field angle, and thus its application field is rapidly expanding.

Up to date, use has been made of a gap reducing technique to meet a demand of improving the response speed more and more. In consequence, in increasing cases post-like spacers are formed on either substrate to keep the reduced gap uniformly and accurately in the display.

However, in the case of using post-like spacers in the in-plane switching mode, display irregularities are generated in the black display. Such display irregularities are recognized particularly strongly in the black display. The display irregularities mean a phenomenon which is brought about when some externally exerted force causes a deviation of the opposing substrate with respect to the active matrix substrate in a horizontal direction (i.e., the substrate plane). In the case of post-like spacers, the frictional force between the two substrates is great compared to the case of spherical spacers. In this case, therefore, the original state before the deviation occurrence is not restored, and stress remains accumulated in the glass. This phenomenon results from resultant generation of optical anisotropy in the glass. From the sole standpoint of solving the problem of non-uniform irregularities in the black display, merely the number of the post-like spacers may be reduced to thereby reduce the frictional forces between the two substrates. However, doing so poses a different problem when a pressure is externally exerted in a direction of clamping the liquid crystal panel. The reduced number of post-like spacers can not withstand such exerted pressure, and the post-like spacers undergo plastic deformation to result in the generation of gap irregularities (these irregularities being also referred to as local gap irregularities because they are generated when the external pressure is exerted locally).

As prior art techniques for solving the above problem, mainly two methods are proposed. A first method is to increase the height of some of the post-like spacers. The increased height post-like spacers always keep the gap between the two substrates, and the remaining post-like spacers come to join the gap keeping when a pressure is exerted between the two substrates. Thus, since the number of post-like spacers keeping the gap between the two spacers at all times is reduced, the problem stemming from friction does not arise. Also, when a pressure tending to squeeze the panel is exerted, the small height post-like spacers come to join the gap support, thus suppressing the generation of local gap irregularities. The second method is to dispose post-like spacers on wiring step parts of the active matrix substrate. The parts with the post-like spacers disposed thereon keep the gap between the two substrates at all times, while parts normally not in contact with the active matrix substrate come to join the gap keeping when and only when a pressure is exerted. Thus, it is possible to expect the effects like those described above (see Literature 1: Japanese Patent Laid-Open 2002-182220, for instance).

FIG. 10 is an enlarged-scale front view showing part of the prior art liquid crystal display as described above. Each part enclosed in the solid square is a pixel 600. In each pixel, three primary color filters R, G and B are formed. Post-like spacers 304 are formed in a ratio of, for instance, one per four pixels. FIG. 11 is an enlarged-scale fragmentary sectional view showing post-like spacer parts in a prior art liquid crystal display example and the neighborhood of these parts. As shown in the sectional view of FIG. 11, this example has an array side substrate 201 and an opposing substrate 202. The opposing substrate 202 has step film 306 and protective film 303 and two different kinds of post-like spacers are formed. Large height post-like spacer 304 is formed on the step film 306, and small height post-like spacer 305 is formed on part other than the step film 306. FIG. 12 is an enlarged-scale fragmentary sectional view showing post-like spacer parts in a different prior art liquid crystal display example and the neighborhood of these parts. The FIG. 12 prior art example has an array side substrate 201 with signal lines 40 formed thereon and an opposing substrate 202. The opposing substrate 202 has post-like spacers 304 formed at position corresponding to the signal lines and other post-like spacers 305 formed at positions spaced apart from the positions of the signal lines 40. The post-like spacers formed at different positions with respect to the signal lines 40 have the following effect. The post-like spacers 304 are in contact with the signal lines 40 and supports the gap between the two substrates 201 and 202, while the other post-like spacers 305 are normally spaced apart from the array side substrate and are brought into contact therewith when and only when an external force is exerted to the opposing substrate 202.

FIGS. 16(A) to 16(C) are views for describing a prior art problem that when the liquid crystal display is used under a high temperature condition, the liquid crystal gathers in the neighborhood of the inflated lower part of the liquid crystal display. Referring to FIGS. 16(A) to 16(C), liquid crystal 500 is sealed between the array side substrate (i.e., active matrix substrate) 201 and the opposing substrate 202, and a plurality of spacers 304 are formed between the array side substrate 201 and the opposing substrate 202 to keep the gap therebetween. FIG. 16(A) shows a status at a relatively low temperature T1° C. FIG. 16(B) shows a status at a higher temperature T2° C. FIG. 16(C) shows a status at a further high temperature T3° C.

Specifically, the liquid crystal 500 is inflated with rising temperature. When the liquid crystal 500 is inflated in excess of the return extent of the post-like spacers 304 (i.e., extent of squeezing a the time of the gap formation), it is now inflated in such a manner that the post-like spacers 304 can no longer be held between the array substrate 201 and the shared electrode substrate 202 (i.e., in an increased state of the gap h between the two substrates). Eventually, as shown in FIG. 16(C), the liquid crystal 500 is collected by the gravitational force in the neighborhood of the inflated lower part of the liquid crystal display device. As a result, gap irregularities are generated. In this specification, this phenomenon is referred to as lower part gap irregularities or high temperature gap irregularities.

FIGS. 13(A) and 13(B) are views for explaining a problem in the prior art example shown in FIG. 11. In the example shown in FIG. 11, a pillow of the color material of the opposing substrate 202 and a black matrix (BM) material is provided under the post-like spacer 304. In this case, as shown in FIG. 13(A), a height (or projection extent) difference of nearly 1 μm is made between the large and small height post-like spacers 304 and 305. In such a case, as shown in FIG. 13(B), when a pressure (i.e., external force) having a component tending to reduce the gap between the array side substrate 201 and the opposing substrate 202, the post-like spacer 304 is squeezed by about slightly less than 1 μm until the post-like spacer 305 is held in contact with the array side substrate 201. The material of the post-like spacers 304 and 305 usually undergo plastic deformation. Therefore, when the pressure is released, the post-like spacer 304 is not restored up to the original height. Consequently, local gap irregularities are generated. FIGS. 14(A) to 14(C) show the manner of this generation of the local gap irregularities in the mentioned order of Figures. As shown, an excessive thickness of the step film 305 poses a problem that reduction of the friction and prevention of the generation of the local gap irregularities cannot be attained at a time.

In the other example shown in FIG. 12, the place in which the post-like spacer 304 is installed on or in contact with the array side (or active matrix) substrate 201 corresponds to a signal line (or wiring end part) 40 of the array side substrate 201, while the post-like spacer 305 is brought into contact with the array side substrate 201 when and only when a pressure for squeezing the panel is applied. FIGS. 15(A) and 15(B) are views for describing the effect on the aperture ratio in the other prior art example in FIG. 12. In the case shown in FIG. 15(A), the post-like spacer 304 is in contact with the position on the scan line 11, so that the aperture radio is not affected. In the case of FIG. 15(B), the post-like spacer 305 is located at a position deviated from the scan line 11, the signal line 40 or the frame-like black matrix 301 (i.e., the post-like spacer 305 necessarily approaches the post-like spacer 305), thus giving rise to reduction of the aperture ratio. Besides, since the post-like spacer 305 is disposed in a place close to the aperture, a problem arises that it is possible that the orientation of liquid crystal layer 500 in the neighborhood of each post-like spacer 305 is adversely affected.

Furthermore, the array side substrate 201 and the opposing substrate 202 are usually deviated from each other by several μm as engagement deviation. The fluctuations of the deviation extent leads to the problem of fluctuations of the areas in which the post-like spacers 304 and 305 are in contact with the array side substrate 201. Therefore, the intended effect is fluctuated. As yet further problems, in the prior art examples shown in FIGS. 11 and 12 two different kinds of post-like spacers, i.e., the post-like spacers 304 for keeping the gap between the two substrates 201 and 202 and the post-like spacers 305 coming to join the keeping when and only when a pressure is exerted to the panel, it is difficult to preclude the aperture ratio reduction and also obtain proper film thickness range as described above.

Moreover, the prior art has a high temperature operation problem that in this case the above lower part gap irregularities (i.e., high temperature gap irregularities) may be caused.

SUMMARY OF THE INVENTION

The present invention has been make in view of the above problems inherent in the prior art, and it has an object of providing a liquid crystal display device, which can overcome or alleviate these problems.

According to an aspect of the present invention, there is provided a liquid crystal display device comprising an array substrate, a shared electrode substrate, and liquid crystal sealed between said two substrates, said shared electrode substrate having a plurality of post-like spacers formed on the surface opposing the array substrate and at positions dispersed in the opposing surface plane such as to keep said two substrates spaced apart a predetermined gap from each other, wherein: said plurality of spacers include first group post-like spacers each having a free end in contact with a corresponding part of said array substrate at all times, and second group post-like spacers each having a free end normally not in contact with a corresponding part of said array substrate and brought into contact with said part when the gap between said two substrates is reduced; and said array substrate having a step film including an inorganic film formed on said opposing surface of said shared electrode substrate at each of positions including the normal contact positions to have the free end of each said first group post-like spacer in contact with said shared electrode substrate at all times.

The step film has a thickness of substantially greater than 2,000 Å and less than 5,000 Å. The step film is formed by laminating an inorganic material layer on a part of said array substrate with a scan line formed thereon. The organic material layer is formed by laminating layers of different organic materials. The step film is made of at least one member of the group consisting of amorphous silicon, chromium, and aluminum.

Each said first group post-like spacer is formed to have a first height such that in the initial state of contact of its free end with a corresponding part of said array substrate, the gap between said two substrates at said contact state part is greater than the gap between said two substrates in areas peripheral to said contact state part. Each said post-like spacer is formed by being contracted from said initial state first height to a second height that the gap between said two substrates in said contact state part is substantially equal to the gap between said two substrates in areas peripheral to said contact. The plurality of post-like spacers are formed at such a density that when said first and second group post-like spacers are all in contact with corresponding array substrate parts, respectively, the sum of the contacted areas corresponds to at least 1,000 $\mu m^2$ per unit area (of 1 $mm^2$) on the side of said array substrate, the radio of the contact areas of said first post-like spacers to said contact area sum being at least 500 $\mu m^2$ per said unit area (of 1 $mm^2$).

Other objects and features will be clarified from the following description with reference to attached drawings.

PREFERRED EMBODIMENTS OF THE INVENTION

Preferred embodiments of the present invention will now be described with reference to the drawings.

Figure 1:
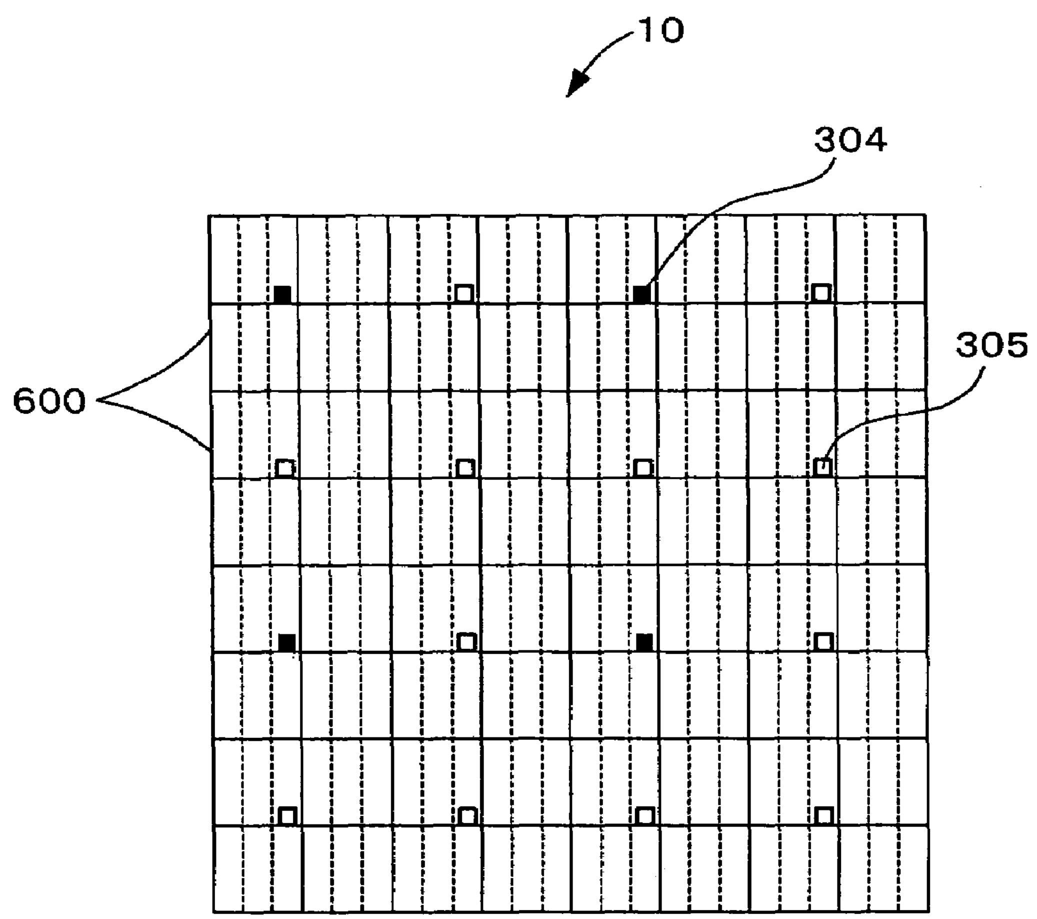
FIG. 1 is an enlarged-scale fragmentary front view showing a liquid crystal display device according to the present invention.

FIG. 1 is an enlarged-scale fragmentary front view showing a liquid crystal display device according to the present invention. More specifically, FIG. 1 shows the disposition status (i.e., disposition density) of post-like spacers for keeping the gap between two substrates, i.e., an array substrate and an in-plane electrode substrate, of the liquid crystal display device. As described later, the liquid crystal display device 10 has a number of pixels 600 arranged in a matrix array and each having three primary color (i.e., R, G and B) filters.

In this embodiment of the liquid crystal display device 10, two different kinds of post-like spacers, i.e., a first group of post-like spacers A 304 and a second group of post-like spacers B 305 are disposed. These post-like spacers A 304 and B 305 are uniformly distributed over the entire display panel surface of the liquid crystal display 10, i.e., uniformly dispersed in the plane of the surface of a shared electrode substrate opposing the array substrate in a ratio of, for instance, one for every four pixel parts.

Figures 2A, 2B:
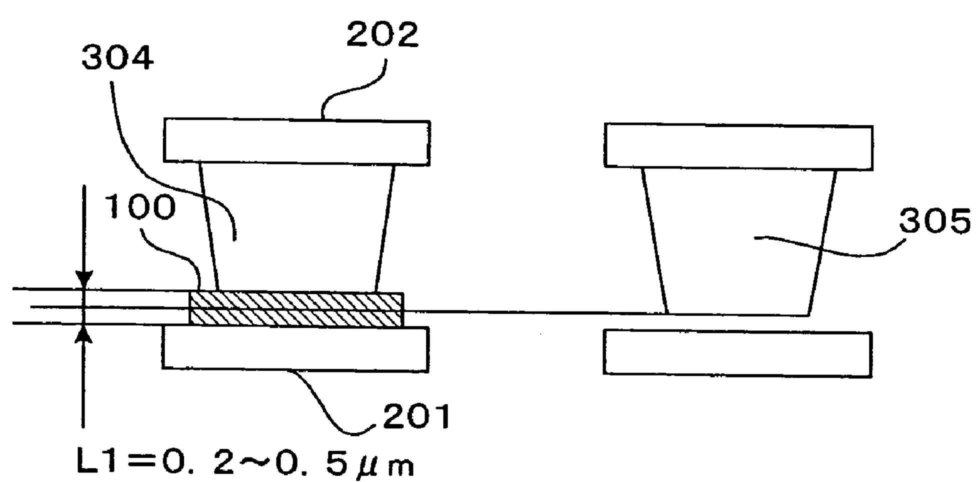
FIGS. 2(A) and 2(B) are enlarged sectional views of two post-like spacers in FIG. 1.

FIGS. 2(A) and 2(B) show post-like spacers A 304 and B 305 of the liquid crystal display 10 and related constituent elements. Referring to these Figures, the post-like spacers A 304 and B 305 are provided between paired glass substrates 201 and 202, and keep the gap between these substrates 201 and 202. A layer of a liquid crystal composition to be described later, i.e., a liquid crystal layer, is sealed between the glass substrates 201 and 202 in a well-known method.

The glass surface 201 is an active matrix substrate (hereinafter referred to as array side substrate), and its inner surface is formed with an array of switching elements (TFTs), associated electrodes, etc. to be described later. The glass substrate 202, on the other hand, is an opposing side substrate opposing and spaced apart a predetermined gap from the array side substrate 201. The post-like spacers A 304 and B 305 are both deposited (i.e., formed) on the inner surface of the opposing side electrode 202 opposing the array side substrate 201. The array side substrate 201 has step film 100 formed on its inner surface at position corresponding to each post-like spacer A 304. The step film 100 preferably has a thickness L1 of 0.2 to 0.5 μm (i.e., 2,000 Å to 5,000 Å). The free end of each of a plurality of first group post-like spacers A 304 is in contact with each corresponding step film 100 at all times, while the free end of each of a plurality of second group post-like spacers B 305 is normally (i.e., without any externally exerted force) spaced apart from a corresponding part of the array side substrate 201 by a gap corresponding to the above film thickness L1 of the step film 100.

Figure 3A:
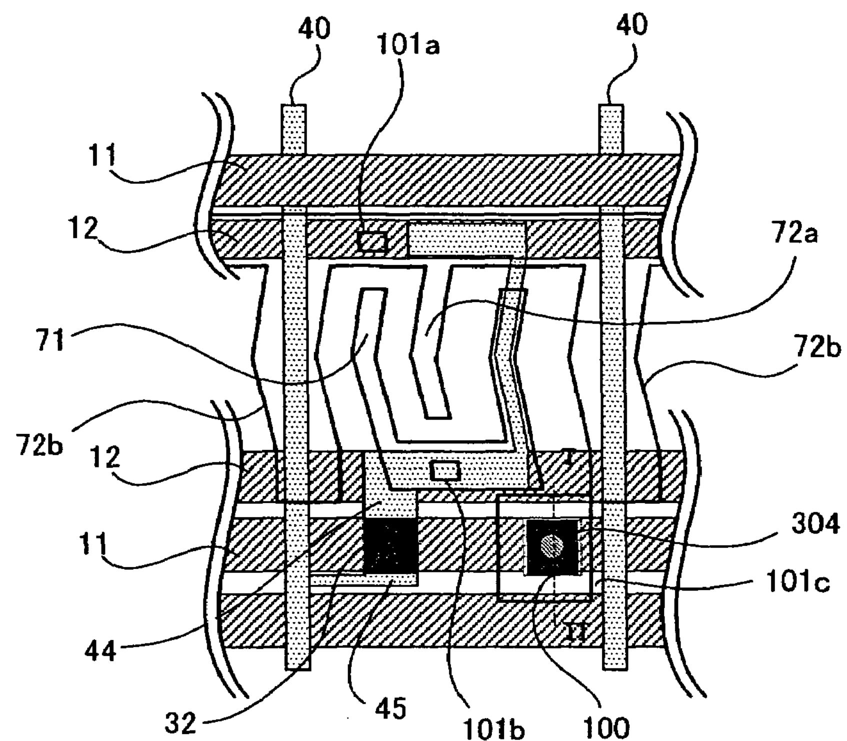
FIGS. 3(A) and 3(B) are an enlarged-scale plan view showing a pixel part with the first post-like spacer in FIG. 1 and a sectional view showing a part including the post-like spacer in FIG. 3(A)

FIG. 3(A) is an enlarged-scale plan view showing a pixel part with the above post-like spacer A 304 formed therein in the first embodiment of the liquid crystal display device 10 according to the present invention. As shown, the pixel has a scan line 11, a shared line 12, an inorganic insulating film 21, a transistor (amorphous silicon: a-Si) 32, a signal line 40, a pixel line 44, a protective film 71, a shared electrode 72*a*, a shield shared electrode 72*b*, a step film 100, a shared electrode contact hole 101*a*, a pixel electrode contact hole 101*b* and a post-like spacer A304.

Figure 3B:
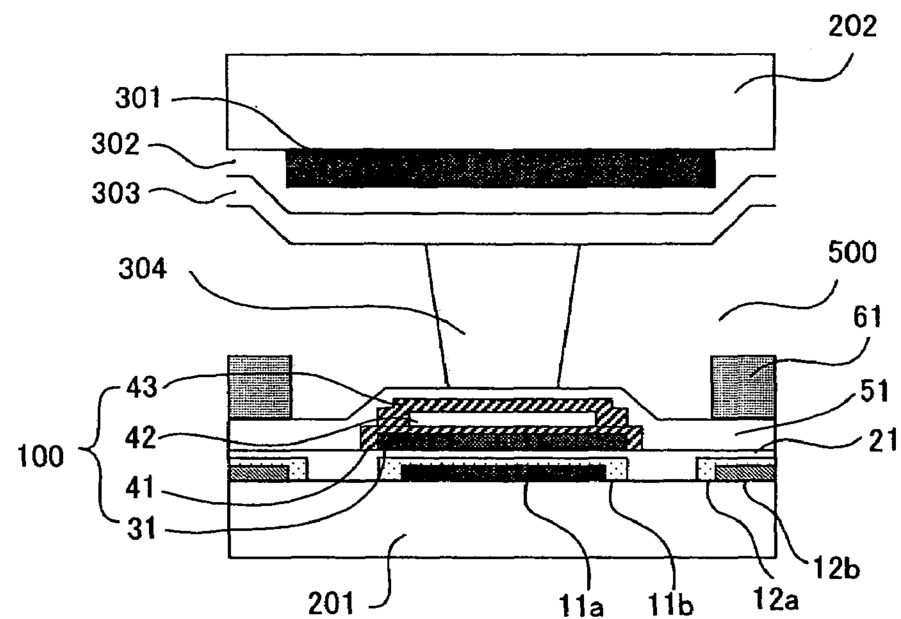

FIG. 3(B) is a sectional view showing a part including the post-like spacer A 304 in FIG. 3(A). The inner surface (i.e., top surface) of the array side substrate 201 has the scan line 11*a* of, for instance aluminum, the scan line 11*b* of, for instance, chromium (Cr), the shared line 12*a* of, for instance, aluminum, the shared electrode 12*b* of, for instance, chromium, the inorganic insulating film 21, the protective film 51, an organic film 61 and the step film 100 formed at a position corresponding to the post-like spacer A 304. The step film 100 is constituted by a lower most (i.e., innermost) amorphous silicon layer, a first chromium layer 41, an aluminum layer 42 and a second chromium layer 43, these layers being formed in the mentioned order.

The inner surface (i.e., lower surface) of the opposing side substrate 202 is formed with a black matrix (BM) 301, a color layer 302 and a protective layer 303. The post-like spacer A 304, having a predetermined height, is deposition formed on the protective layer 303. A liquid crystal layer 500 is clamped or injected (i.e., sealed) in the gap between the two substrates 201 and 202.

Figure 4A:
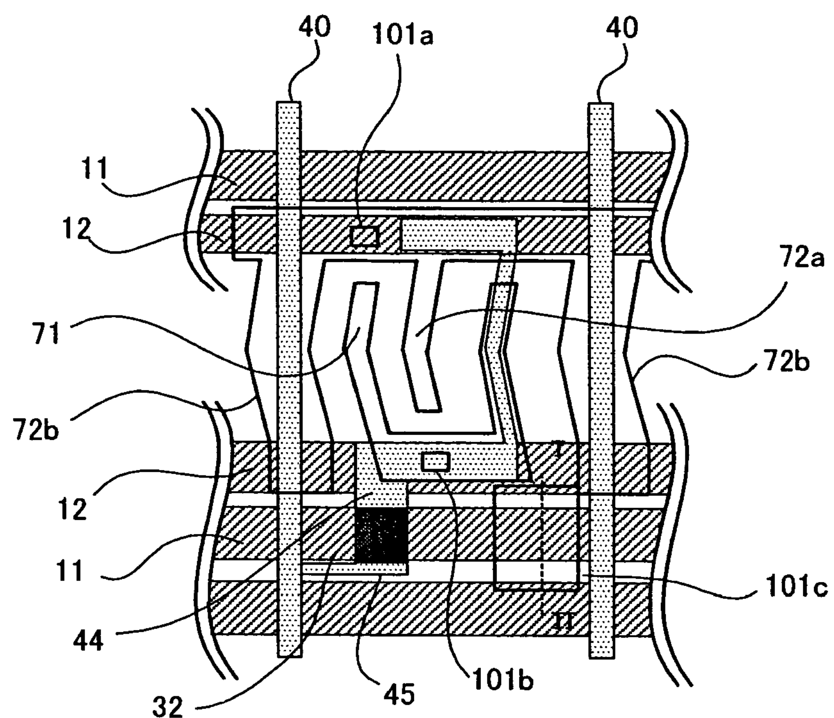
FIGS. 4(A) and 4(B) are an enlarged-scale plan view showing a pixel part with the second post-like spacer in FIG. 1 and a sectional view showing a part including the post-like spacer in FIG. 4(A)
Figure 4B:
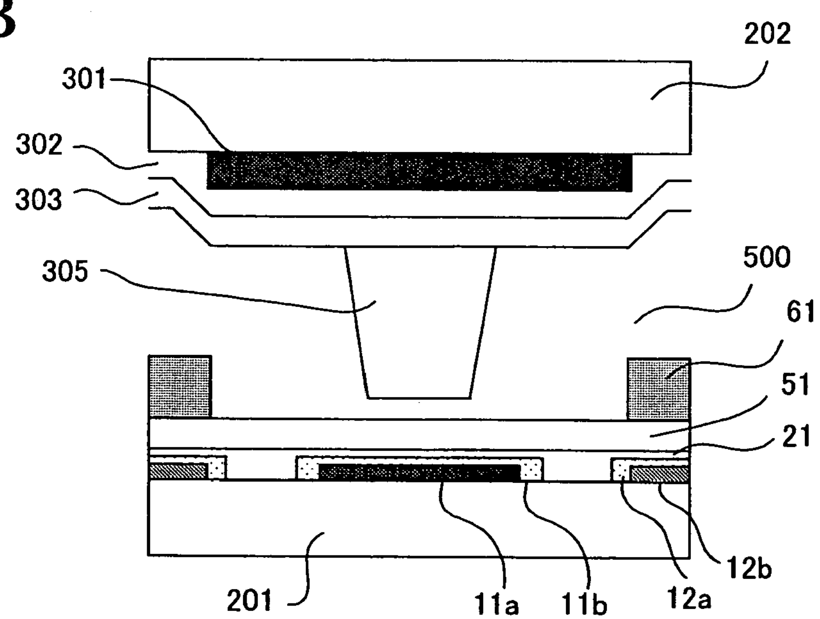

FIGS. 4(A) and 4(B) are enlarged-scale fragmentary views showing the pixel position corresponding to the post-like spacer B 305. Specifically, FIG. 4(A) is a plan view, and FIG. 4(B) is a sectional view showing the part including the post-like spacer B 305 in FIG. 4(A). FIG. 4(A) is substantially the same as FIG. 3(A) except for that the step film 100 in FIG. 3(A) is not formed. FIG. 4(B) is analogous to FIG. 3(B). In this case, however, the post-like spacer B 305 is formed instead of the post-like spacer B 305, and the step film 100 is not formed at the position on the array side substrate 201 corresponding to the post-like spacer B 305. The free end of the post-like spacer B 305 is thus spaced apart from the protective film 51.

As described above, each first group post-like spacer A 304 is in contact with each step film 100 formed on the active matrix side substrate (i.e., array side substrate) 201 at all times. Each second group post-like spacer B 305 is normally not in contact with the opposed active matrix side substrate 201 because the above step film 100 is not provided, and it is brought into contact with the substrate 201 when and only when the gap between the two substrates 201 and 202 is reduced. In FIG. 1, each area enclosed in each bold line rectangle corresponds to one pixel. In the embodiment shown in FIG. 1, each post-like spacer A 304 is disposed for every six pixels, while three post-like spacers B 305 are provided for every sixteen pixels. For example, assuming the contact area of one post-like spacer to be 20 μm×20 μm, i.e., 400 $\mu m^2$, the pixel pitch to be 300 μm vertical and 300 μm horizontal and the post-like spacer contact density to be one per four pixels as in FIG. 1, the sum of the contact areas of all post-like spacers (i.e., the sum number of the post-like spacers A 304 and B 305) per unit area (of 1 $mm^2$) is 400 $\mu m^2$×(1,000/300)×(1,000×300)×¼=1111 $\mu m^2$. ¼ of this value is the sum of the contact area of the sole post-like spacers A 304, i.e., it is 278 $\mu m^2$ per unit area (of 1 $mm^2$).

The process of manufacture of the liquid crystal display 10 having the above arrangement will now be described with respect to one pixel with reference to FIGS. 3(A) and 3(B).

First, the scan line 11 and the shared electrode line 12 are formed the glass substrate 201. Then, the inorganic insulating film 21 is formed. Then, the amorphous silicon layer 31 is formed for forming the transistor 32. In this embodiment, the step film 100 is formed at the same time in this step. Also, the step film 100 is formed by laminating three layers, i.e., the first chromium layer 41, the aluminum layer 42 and the second chromium layer 43, on the amorphous silicon layer 43. At this time, a drain electrode, a source electrode and an inner layer pixel electrode of the transistor 32 are also formed. Subsequently, the inorganic insulating film (i.e., protective film) 51 is formed, and them the organic film 61 is formed. Then, the contact hole 101*b* is formed. This contact hole 101*b* is formed for connecting the pixel electrode and the shared electrode 12 formed on the organic film 61 to the pixel electrode and the shared line formed underneath. At this time, the organic film in the place of disposition of the post-like spacer is deleted. Finally, an ITO transparent electrode is formed as uppermost most (or outermost) layer to complete the pixel.

As shown in the sectional view of FIG. 3(B), in the part contacted by the post-like spacer 304 the step film 100 is formed by forming the amorphous silicon layer (a-Si) 31 and the laminate structure of the signal line layer (i.e., first chromium layer) 41, the aluminum layer 42 and the second chromium layer 43. The thickness of each layer varied with each product, and thus actually layers of different organic materials are laminated in an adequate combination as in the above example such as to form the step film 100 such that the resultant laminate preferably has a thickness of 2,000 Å to 5,000 Å. The organic film 61 is formed to have a thickness of about 1.5 μm.

Figure 5A:
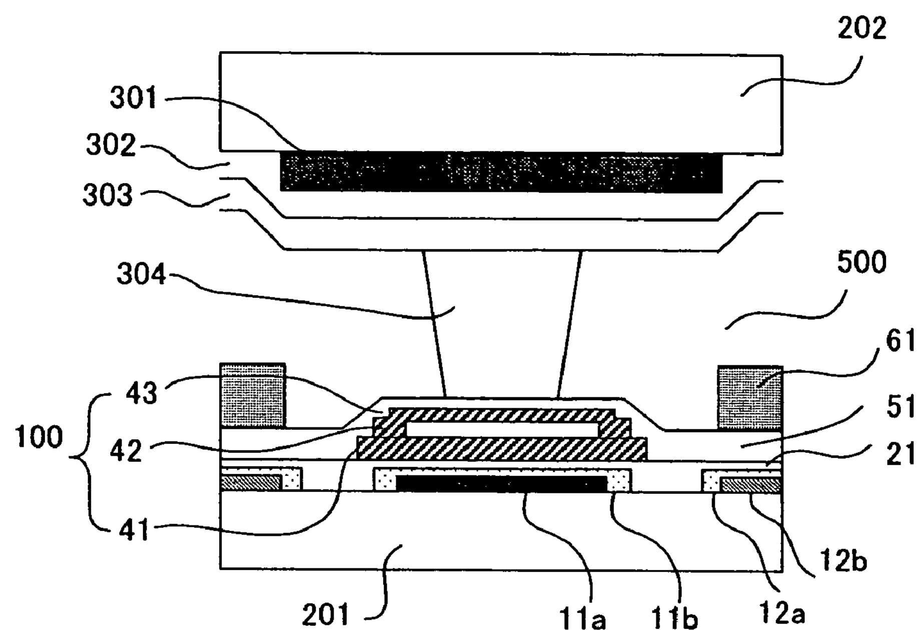
FIGS. 5(A) and (B) are sectional views of the step film 100.

As described above, the step film 100 is formed concurrently with the formation of the signal line and the amorphous silicon layer. While an example of the step film 100 is shown in FIG. 3(B), the step film 100 according to the present invention is not limited to the example shown in FIG. 3, but it is possible to variously select the material used for each accumulated layer, the number of laminated layers and the thickness thereof. The step film 100 shown in FIG. 5(A) is constituted by the first chromium layer 41 forming the signal line, the aluminum layer 42 and the second chromium layer 43. The step film 100 shown in FIG. 5(B), on the other hand, is constituted solely by the first chromium layer 41 forming the signal line and the second chromium layer 43. As shown, it is possible to obtain a desired step (i.e., film thickness) by adequately laminating organic films is necessary. Such organic layers may be adequately combined to form the step layer 100 according to the necessary film thickness.

As described above, FIGS. 4(A) and 4(B) show the plan view and the sectional view of arrangement on the side of the active matrix substrate 201 with scale enlargement of the pixel part with the post-like spacer B 305 disposed thereon. The step film 100 is not formed in the place corresponding to the free end of the post-like spacer B 305. That is, a gap is formed between the post-like spacer B 305 and the active matrix substrate 201. When and only when an external force tending to squeeze the panel is exerted, the post-like spacer B 305 is brought into contact with the active matrix substrate 201 to join the keeping of the gap between the two substrates 201 and 202.

Figure 5B:
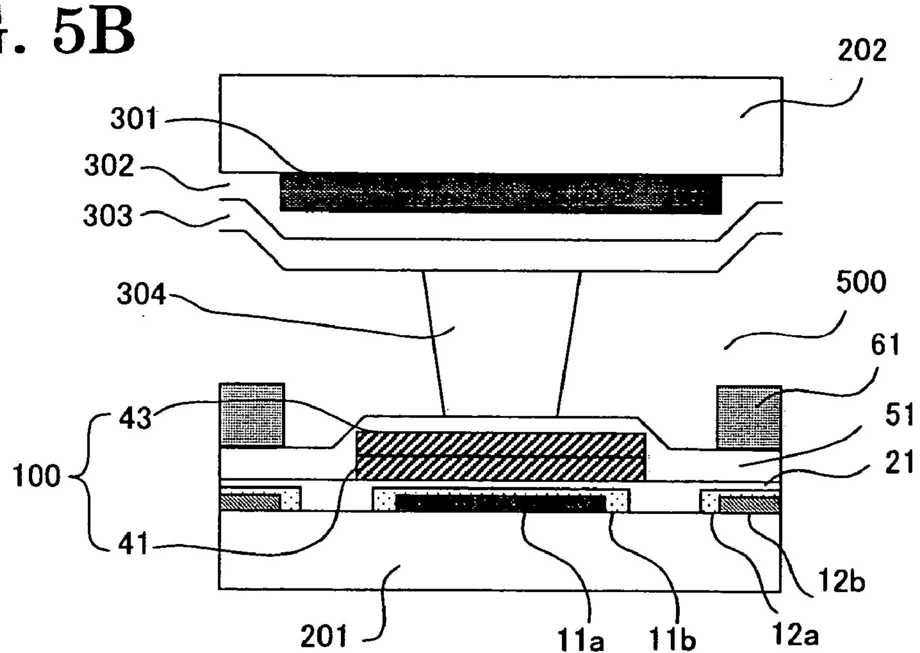
Figure 6A:
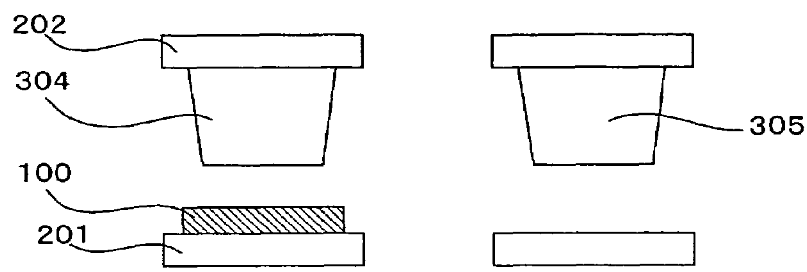
FIGS. 6(A) to 6(C) are views showing the gap formation process by showing the step in a simplified fashion.
Figure 6B:
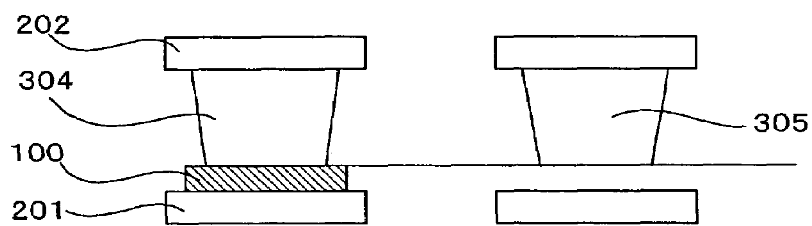
Figure 6C:
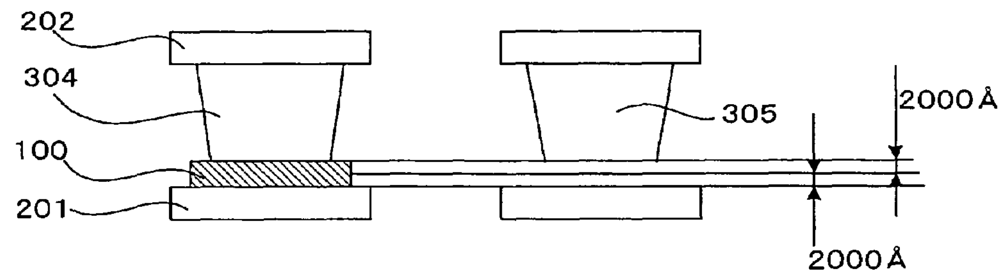

By overlapping together the active matrix substrate 201 and the opposing substrate 202 as described above, the arrangements shown in the sectional views of FIGS. 3(B), 5(A) and 5(B) are finally obtained. The process of forming the above gap will now be described. FIGS. 6(A) to 6(C) are views showing the gap formation process by showing the step in a simplified fashion. In FIGS. 6(A) to 6(C), the left side shows a part including the post-like spacer 304 (i.e., first group post-like spacer A), and the right side shows a part including the post-like spacer 305 (i.e., second group post-like spacer B). FIG. 6(A) shows the array side substrate 201 and the opposing side substrate 202 as isolated single members, respectively. FIG. 6(B) shows that the post-like spacer A 304 is in contact with the array side substrate 201 without being squeezed. FIG. 6(C) shows the state that the gap is finally formed.

First, the height of post-like spacer before the array side substrate 201 and the opposing side substrate 202 are overlapped together, should be greater than at the time of the gap formation, and at the time of the gap formation by overlapping the array side substrate 201 and the opposing side substrate 202, the post-like post A 304 should be pushed in by about 1,000 Å to 2,000 Å. The greater the push-in extent, the greater is the extent of restoration of the spacer when the liquid crystal is inflated with temperature rise. However, with great push-in extent, the frictional force between the two substrates 201 and 202 is increased to deteriorate the status of black view non-uniformity irregularities. For the optimum compromise, the spacer push-in at the gap formation time may be done by 0.1 μm to 0.2 μm.

If the gap is formed by pushing in each first group post-like spacer A 304 by 2,000 Å, the step film 100 has a thickness of 4,000 Å, that is, each second group post-like spacer B 305 is spaced apart by 2,000 Å from the active matrix substrate 201. In this case, normally only each first group post-like spacer A 304 is in contact, and black view non-uniform irregularities are not so much. Also, in the event of load application tending to squeeze the panel, each second group post-like spacer B 305 joins the load support when each first group post-like spacer A 304 is pushedly squeezed by about 2,000 Å, and no local gap irregularities are generated.

Figure 14A:
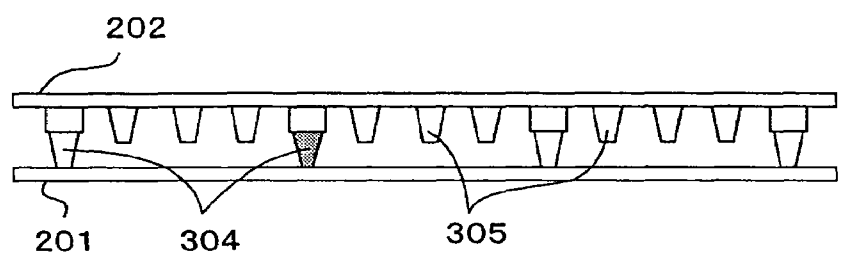
FIGS. 14(A) to 14(C) are sectional views for explaining the problems when the external pressure is applied.
Figure 14B:
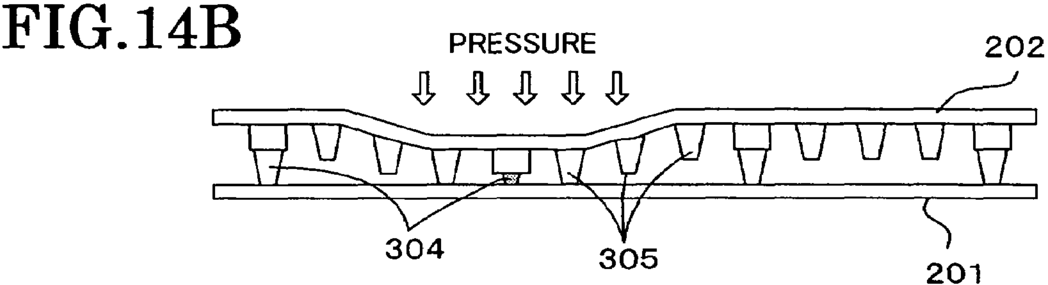
Figure 14C:
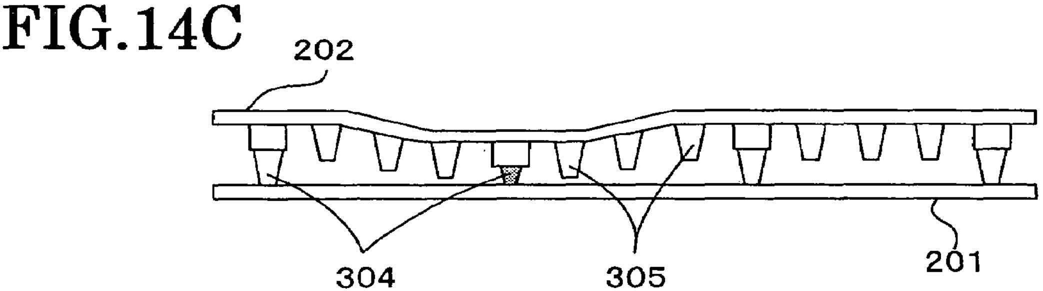
Figure 15A:
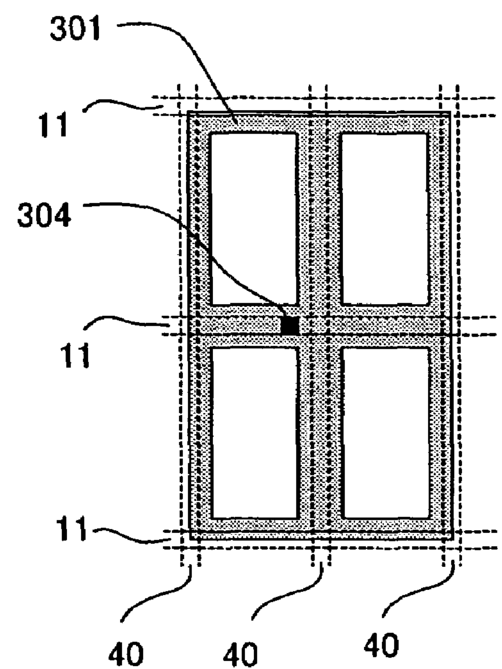
FIGS. 15(A) and 15(B) are views for explaining the problem of the aperture ratio reduction of the other prior art example in FIG. 12.
Figure 15B:
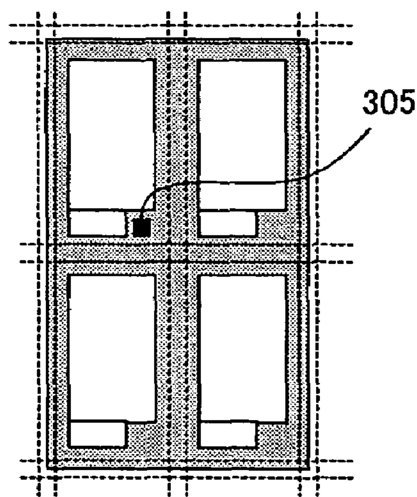
Figure 16A:
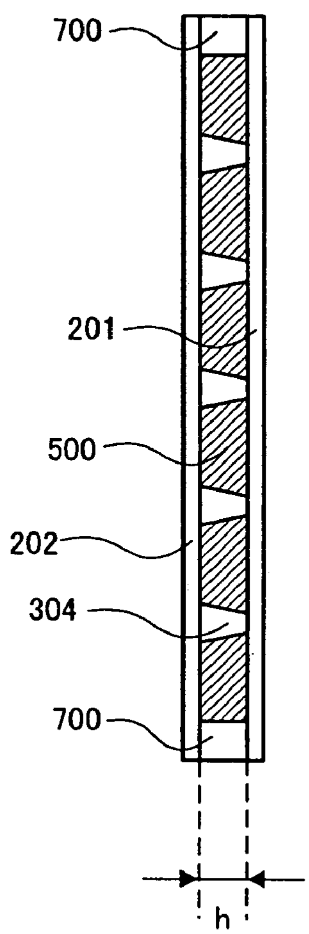
FIGS. 16(A) to 16(C) are views for explaining the prior art problem that when the liquid crystal display is used under a high temperature condition, the liquid crystal gathers in the neighborhood of the inflated lower part of the liquid crystal display.
Figure 16B:
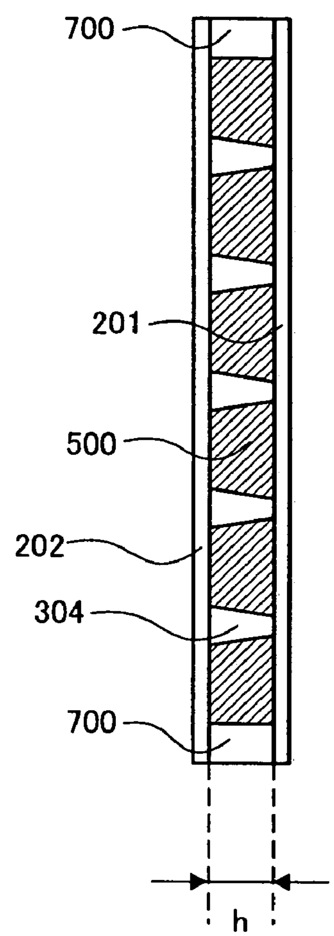
Figure 16C:
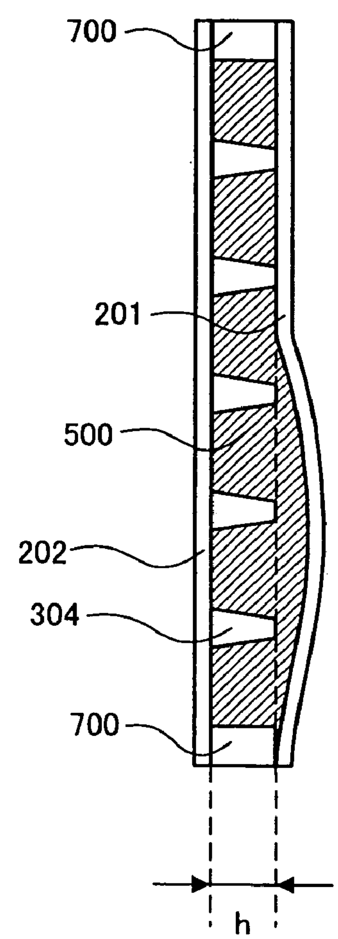

Converse to the above case, a case of inconvenience occurrence will be described under assumption. If the height of the step film 100 were 10,000 Å (i.e., 1 μm), the gap is 8,000 Å. In this case, in the event of application of a load tending to squeeze the panel, the free end of each second group post-like spacer B 305 will not be brought into contact with the array side substrate 201 to join the load support unless each first group post-like spacer A 304 is squeezed by 8,000 Å. In the event of great squeezing of each first group post-like spacer A 304, the extent of plastic deformation is increased as is obvious from the elasticity/plasticity characteristic of the post-like spacer A 304. Consequently, each first group post-like spacer A 304 is not restored up to the original height, resulting in generation of local gap irregularities (generation of local gap irregularities as described above with reference to FIGS. 14(A) to 14(C).

As described above, the thickness of the step film 100 (i.e., the difference between the heights of the first and second group post-like spacers A 304 and B 305) is very important. By setting the thickness of the step film 100 to about 2,000 Å to 5,000 521 , improvement is obtainable with respect to the black view non-uniformity irregularities, local gap irregularities and high temperature irregularities (i.e., lower part gap irregularities).

Figure 7A:
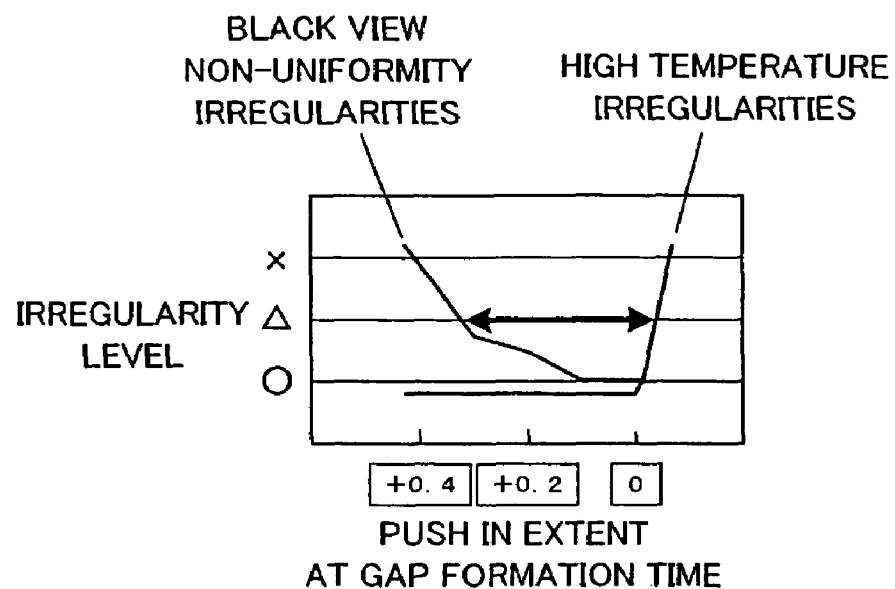
FIGS. 7(A) and 7(B) are views showing the relationship between the post-like spacer push-in extent at the gap formation time and the corresponding generation status of black view non-uniform irregularities and high temperature gap irregularities.
Figure 7B:
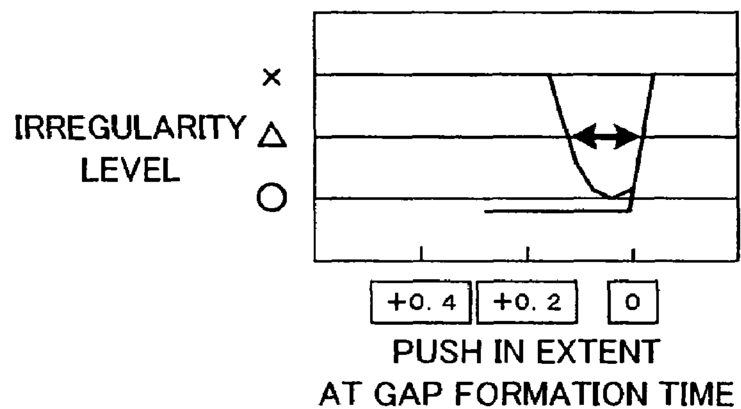
Figure 8:
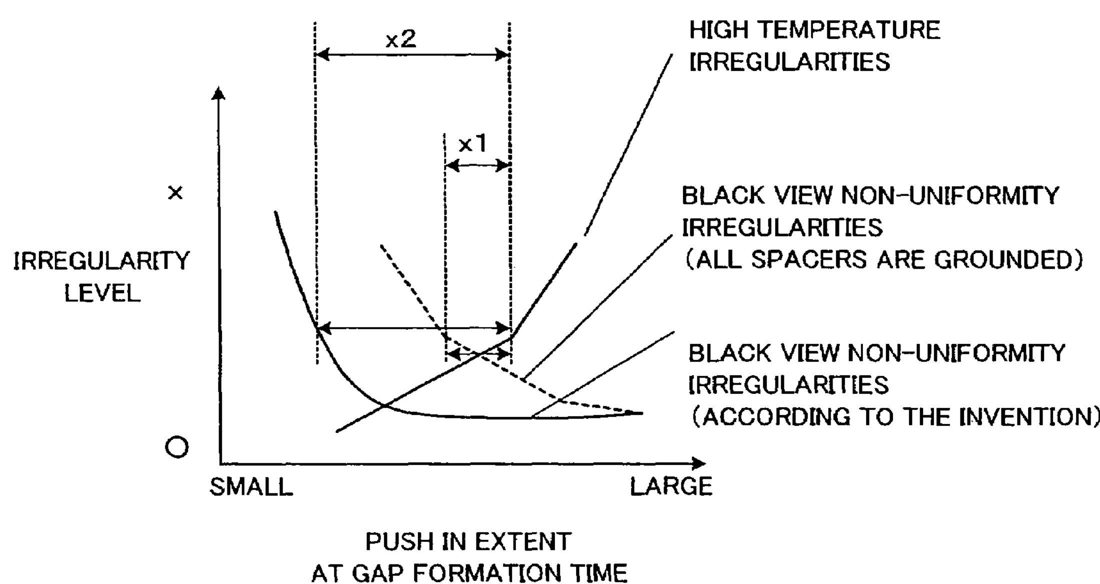
FIG. 8 is a view showing the combination of the characteristics shown in FIGS. 7(A) and 7(B)

FIGS. 7(A) and 7(B) are views showing the relationship between the post-like spacer push-in extent at the gap formation time and the corresponding generation status of black view non-uniform irregularities and high temperature gap irregularities. In the Figures, the abscissa is taken for the "push-in extent at gap formation time", i.e., extents of the post-like spacer push-in at the gap formation time relative to zero as optimum push-in extent, and the ordinate is taken for "irregularity level", i.e., decision values concerning the extent of generation of the above black view non-uniformity irregularities and high temperature irregularities corresponding to the push-in extents. The above trend is thus expressed in graphs. As for the "irregularity level" in the abscissa, a decided extent that the above pertinent irregularities are hardly generated is expressed as [o], a decided extent that the irregularities are slightly generated is expressed as [Δ], and a decided extent that the irregularities are generated greatly and defectively is expressed as [x]. FIG. 7(A) concerns the characteristic obtainable according to the present invention. FIG. 7(B) concerns a reference example in the case of an arrangement that all the post-like spacers are in contact at a time. FIG. 8 is a view showing the combination of the characteristics shown in FIGS. 7(A) and 7(B). It will be readily understood from FIGS. 7(A), 7(B) and 8 that, according to the present invention the state that the generation of the above black view non-uniform irregularities and high temperature gap irregularities is decided to be less (i.e., satisfactory state), and this state is maintained over a relatively broad range of the above push-in extent.

Usually, the scan line 11 is formed to have a large width, providing for redundancy in the areas of disposition of the post-like spacers A 304 and B 305. It is thus possible to do design with redundancy even with respect to the engagement deviation between the active matrix side substrate 201 and the opposing side substrate 202. The obtainable effect is thus less fluctuated by an engagement deviation, if any. Also, disposition of post-like spacer in this part has no substantial adverse effects on the aperture ratio of the liquid crystal display. Furthermore, since this part is remote from the electrode part, defective orientation, if any, in the neighborhood of the post-like spacers A 304 and B 305 has no adverse effects on the display quality. Thus, as shown in FIGS. 3(B), 5(A) and (B), improvement of the above black view non-uniform irregularities, local gap irregularities and high temperature gap irregularities (i.e., lower part gap irregularities) is obtainable by exclusively providing the step film 100 on the scan line 11 and obtaining a desired film thickness with an adequate organic film combination.

A further description of the embodiment of FIGS. 1 to 5(A) and 5(B) will be given. In this arrangement, the organic film 61 is formed on the active matrix substrate 201, and use is made of the step film 100 constituted by inorganic films. For this reason, the organic film 61 in the neighborhood of the post-like spacer contact parts is removed. Thus, the height of each first group post-like spacer A 304 is greater than the gap in the parts of the pixel electrode and the shared electrode. As shown, with the removal of the organic film 61 the height of the post-like spacer a 304 is increased. Thus, the extent of deformation of the post-like spacer A 304 (i.e., ratio of the resultant height to the original height) is reduced to reduce the corresponding plastic deformation extent. Also, it is a merit that a somewhat greater height of the post-like spacer A304 permits formation of a fixed film thickness with better reproducibility. Furthermore, it is possible to provide a relatively large extent of elastic deformation of the post-like spacer. This is a merit in that the high temperature gap irregularities generated under a high temperature condition can be suppressed to an extent that the liquid crystal inflation can be followed up.

Figure 9:
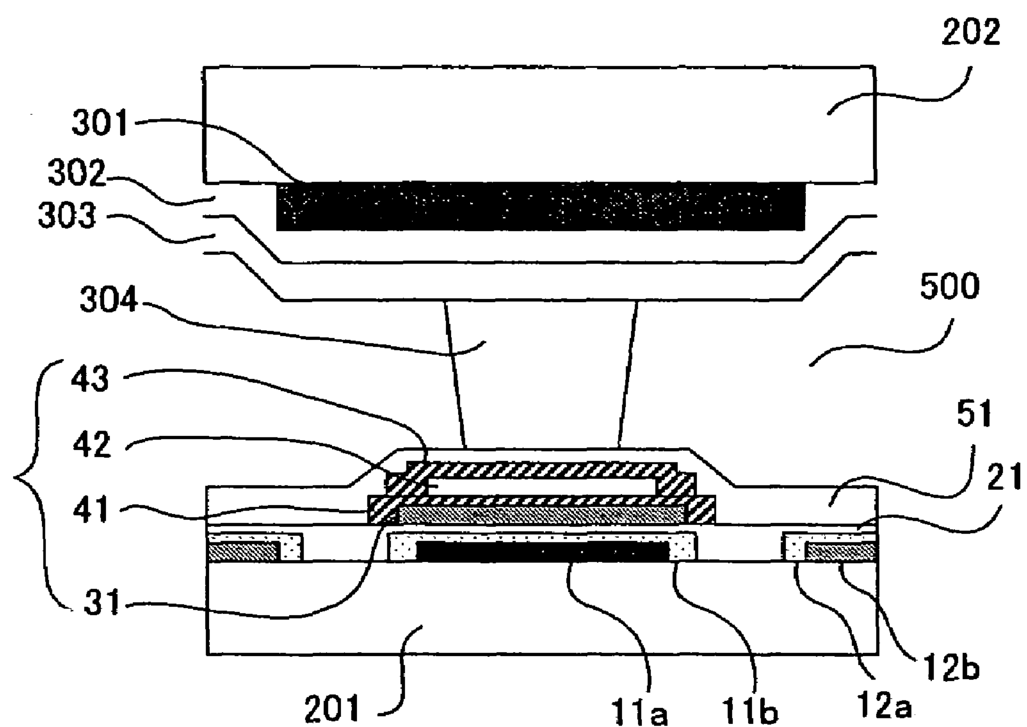
FIG. 9 is a sectional view corresponding to FIG. 3(B) according to a second embodiment of the present invention.
Figure 10:
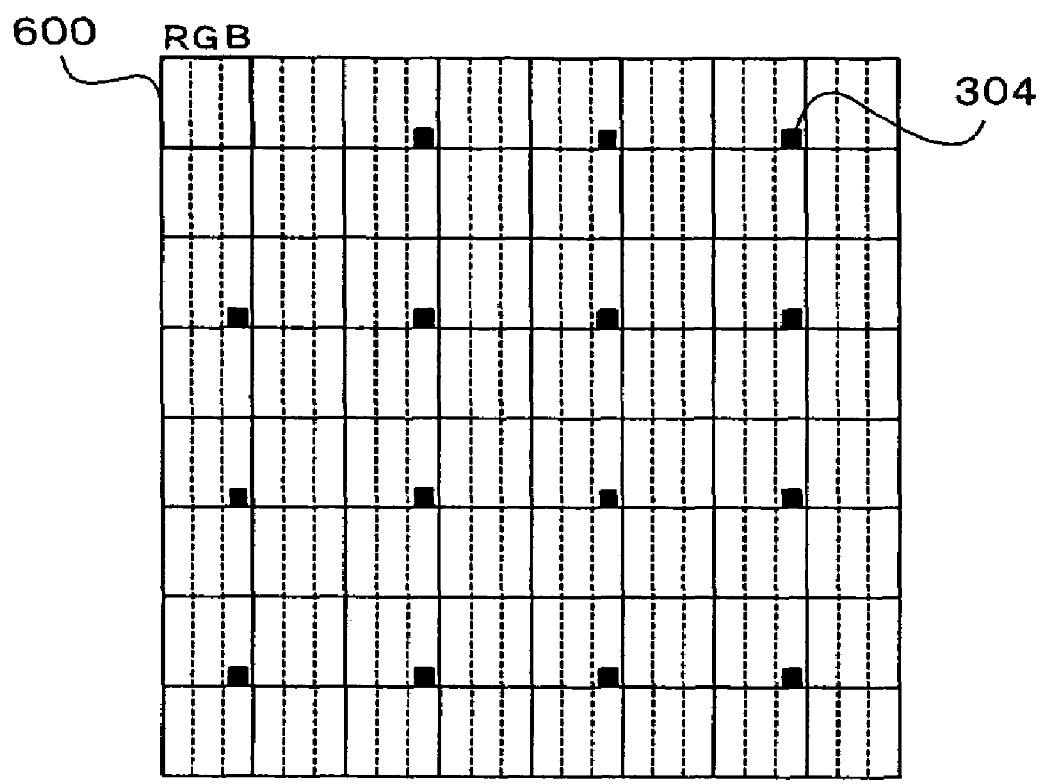
FIG. 10 is an enlarged-scale front view showing part of the prior art liquid crystal display.
Figure 11:
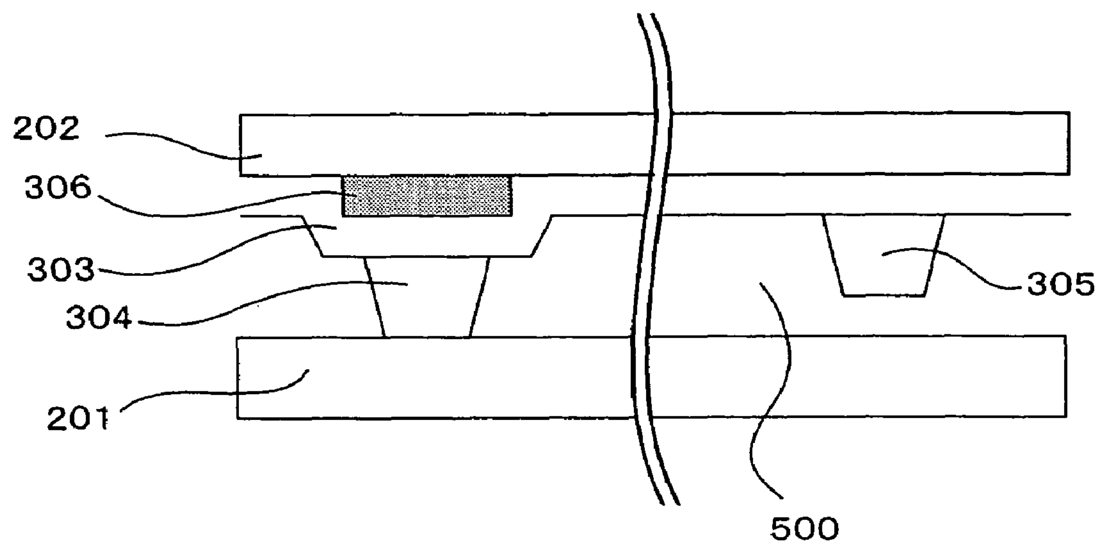
FIG. 11 is an enlarged-scale fragmentary sectional view showing post-like spacer parts in a prior art liquid crystal display example and the neighborhood of these parts.
Figure 12:
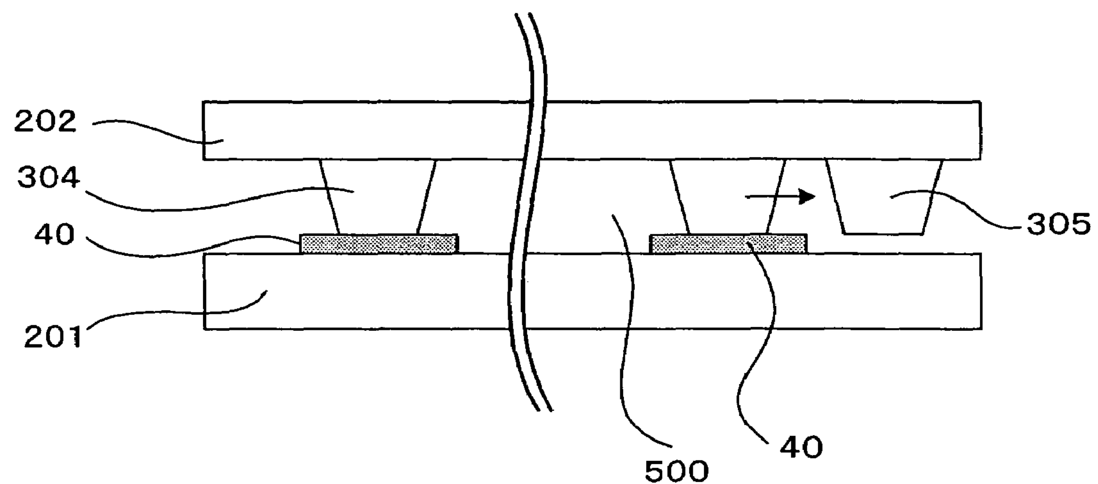
FIG. 12 is an enlarged-scale fragmentary sectional view showing post-like spacer parts in a different prior art liquid crystal display example and the neighborhood of these parts.
Figure 13A:
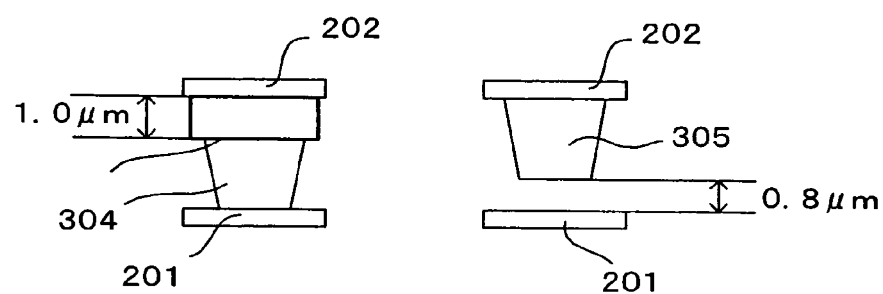
FIGS. 13(A) and 13(B) are views for explaining a problem in the prior art example shown in FIG. 11.
Figure 13B:
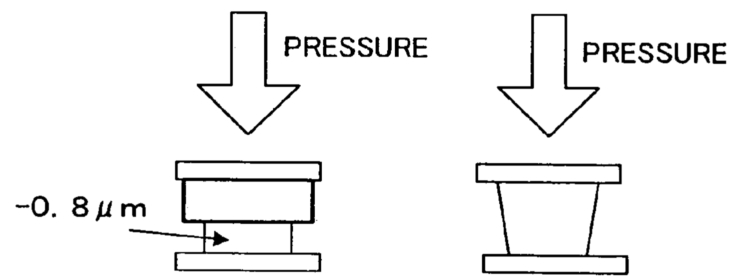

A second embodiment of the liquid crystal display device according to the present invention will now be described with reference to FIG. 9. In this embodiment, no organic film (such as the organic layer 61 in the preceding first embodiment) is formed on active matrix substrate 201. FIG. 9 is a sectional view corresponding to FIG. 3(*b*) noted above. For the sake of the brevity, like constituent elements are designated by like reference numerals.

The second embodiment of the liquid crystal display device has an array side substrate 201 and an opposing substrate 202, and also has, for each pixel, scan lines 11*a* and 11*b*, shared lines 12*a* and 12*b*, an inorganic insulating film 21, a step film 100, a protective film 51, a black matrix 301, a color layer 302, a protective film 303, a post-like spacer A 304 and a liquid crystal layer 500. This embodiment is the same as the first embodiment shown in FIG. 3(B) inasmuch as the step film 100 is constituted by an amorphous silicon layer 31, a first chromium layer 41, an aluminum layer 42 and a second chromium layer 43. However, this second embodiment of the liquid crystal display device is set apart in that no organic film corresponding to the organic film 61 as shown in FIG. 3(B) is formed on the inner surface of the array substrate 201.

Again in this second embodiment of the liquid crystal display device, like the above case of presence of the organic film 61 as shown in FIG. 3(B), the step film 100 is formed, concurrently with the signal line formation, from the amorphous silicon layer 31, the first chromium layer 41, the aluminum layer 42 and the second chromium layer 43. In the case of this arrangement, the pixel electrode is formed with the same layer as the signal line, and the shared electrode 12 is formed with the same layer and the scan line 11. Furthermore, with respect to the arrangement of the step film 100, as shown in the above FIGS. 5(A) and 5(B), a step of about 2,000 Å to 5,000 Å is formed by adequately combining a plurality or organic films.

According to the present invention, the following pronounced practical advantages are obtainable in pertinent embodiments of the present invention. That is, the aperture ratio is not reduced. Also, the process of manufacture is not complicated. Furthermore, the above black display non-uniform irregularities, the local gap irregularities and high temperature gap irregularities (i.e., lower gap irregularities) can be improved. Still further, the possibility of defective liquid crystal orientation generation in the neighborhood of aperture parts can be eliminated. Moreover, it is possible to adequately select the step film thickness in dependence on the purpose and also maintain the display quality even at relatively high temperatures.

Changes in construction will occur to those skilled in the art and various apparently different modifications and embodiments may be made without departing from the scope of the present invention. The matter set forth in the foregoing description and accompanying drawings is offered byway of illustration only. It is therefore intended that the foregoing description be regarded as illustrative rather than limiting.

What is claimed is:

1. A liquid crystal display device comprising:

an array substrate;

a shared electrode substrate; and liquid crystal sealed between said array substrate and said shared electrode substrate, said shared electrode substrate having a plurality of post-like spacers formed on a surface opposing the array substrate and at positions dispersed in an opposing surface plane such as to keep a predetermined gap between said array substrate and said shared electrode substrate, wherein said plurality of post-like spacers comprises:

first group post-like spacers each having a free end in contact with a first corresponding part of said array substrate at all times; and second group post-like spacers each having a free end normally not in contact with a second corresponding part of said array substrate and brought into contact with said second corresponding part when the gap between said array substrate and said shared electrode substrate is reduced, wherein said array substrate comprises a step film including an inorganic film, said step film having a thickness between 2,000 Å to 5,000 Å and formed on said first corresponding part of said array substrate opposing said free end of said first group post-like spacers such that said first group post-like spacers remain in contact with said step film at all times.

2. The liquid crystal display device according to claim 1, wherein said step film is formed by laminating an inorganic material layer on a part of said array substrate with a scan line formed thereon.

3. The liquid crystal display device according to claim 2, wherein said inorganic material layer is formed by laminating layers of different inorganic materials.

4. The liquid crystal display device according to claim 1, wherein said step film comprises at least one member of the group consisting of amorphous silicon, chromium, and aluminum.

5. The liquid crystal display device according to claim 1, wherein each of said first group post-like spacers is formed to have a first height such that in an initial state of contact of said free end with said first corresponding part of said array substrate, a gap between said array substrate and said shared electrode substrate at said initial state of contact is greater than a gap between areas peripheral to said array substrate and said shared electrode substrate at said initial state of contact.

6. The liquid crystal display device according to claim 5, wherein said plurality of post-like spacers are formed by being contracted from said first height of said initial state of contact to a second height, said second height such that the gap between said array substrate and said shared electrode substrate at said initial state of contact is substantially equal to the gap between said areas peripheral to said array substrate and said shared electrode substrate at said initial state of contact.

7. The liquid crystal display device according to claim 1, wherein said plurality of post-like spacers are formed at such a density that, when said first and second group post-like spacers are all in contact with said first and second corresponding array substrate parts, respectively, a sum of the contacted areas corresponds to at least 1,000 $\mu m^2$ per unit area (of 1 $mm^2$) on a side of said array substrate, contact areas of said first group post-like spacers being at least 500 $\mu m^2$ per said unit area (of 1 $mm^2$) of said contacted areas sum.

8. The liquid crystal display device according to claim 1, wherein each of said first post-like spacers has a predetermined height and is formed on an inner surface of said shared electrode substrate, said inner surface comprising a black matrix layer, a color layer and a protective layer, and wherein each of said first-post like spacers is formed on said protective layer.

9. A method of manufacturing a liquid crystal display device, comprising:

forming a step film having a thickness between 2,000 Å to 5,000 Å by forming a signal line and at least one of a chromium layer and an aluminum layer on an amorphous silicon layer, said amorphous silicon layer formed on an array substrate;

forming a first group post-like spacer and a second group post-like spacer on a shared electrode substrate; and contacting a free end of said first group post-like spacer with said step film for forming a gap between said array substrate and said shared electrode substrate, wherein said step film is formed opposite of said free end of said first group post-like spacer such that said first group post-like spacer remains in contact with said step film at all times and a free end of said second group post-like spacer is not normally in contact with said array substrate.

10. The method of manufacturing a liquid crystal display device according to claim 9, further comprising:

forming a scan line on said array substrate such that disposition areas of said first and second group post-like spacers have redundancy.

11. The method of manufacturing a liquid crystal display device according to claim 9, wherein said first group post-like spacer is formed to have a first height such that in an initial state of contact of said free end with said step film of said array substrate, a gap between said array substrate and said shared electrode substrate at said initial state of contact is greater than a gap between areas peripheral to said array substrate and said shared electrode substrate at said initial state of contact.

12. The method of manufacturing a liquid crystal display device according to claim 11, wherein the first and second post-like spacers are formed by being contracted from said first height of said initial state of contact to a second height, said second height such that the gap between said array substrate and said shared electrode substrate at said initial state of contact is substantially equal to the gap between said areas peripheral to said array substrate and said shared electrode substrate at said initial state of contact.

13. The method of manufacturing a liquid crystal display device according to claim 9, wherein said first and second group post-like spacers are formed at such a density that, when said first and second group post-like spacers are all in contact with said array substrate, a sum of areas in contact is at least 1,000 $\mu m^2$ per unit area (of 1 $mm^2$) on a side of said array substrate, where contact areas of a plurality of said first group post-like spacers is at least 500 $\mu m^2$ per said unit area (of 1 $mm^2$) of said sum of said areas in contact.

* * * * *